United States Patent
Nanis et al.

[15] 3,663,300
[45] May 16, 1972

[54] FOAM ELECTROLYTE, FUEL CELL, AND METHOD FOR INCREASING EFFECTIVENESS OF FUEL CELLS

[72] Inventors: Leonard Nanis, 116 Cornell Avenue, Swarthmore, Pa. 19081; Frank R. McLarnon, 766 Elmwood Avenue, Sharon Hill, Pa. 19074

[22] Filed: June 12, 1969

[21] Appl. No.: 832,704

[52] U.S. Cl. .................................................136/86 E
[51] Int. Cl. .................................................H01m 27/00
[58] Field of Search ..........................................136/86

[56] References Cited

UNITED STATES PATENTS

| | | | |
|---|---|---|---|
| 3,238,066 | 3/1966 | Klass et al. | 136/86 C |
| 3,313,656 | 4/1967 | Blomgren et al. | 136/86 |
| 3,338,746 | 8/1967 | Plust et al. | 136/86 C |
| 3,281,274 | 10/1966 | Moerikofer | 136/86 C |
| 3,313,656 | 4/1967 | Blomgren et al. | 136/86 |
| 3,403,055 | 9/1968 | Weiss et al. | 136/86 |

*Primary Examiner*—Winston A. Douglas
*Assistant Examiner*—H. A. Feeley
*Attorney*—Caesar, Rivise, Bernstein & Cohen

[57] ABSTRACT

The introduction of one or more ingredients of a chemical reaction into a foam atmosphere for the purpose of promoting such reaction. With respect to the application of the present invention to fuel cells, the electrolyte in one or both the anode and cathode cabinets of a fuel cell is modified with the addition of a foaming agent so that the electrodes of the cell are in contact with foamed electrolyte.

10 Claims, 1 Drawing Figure

Patented May 16, 1972
3,663,300
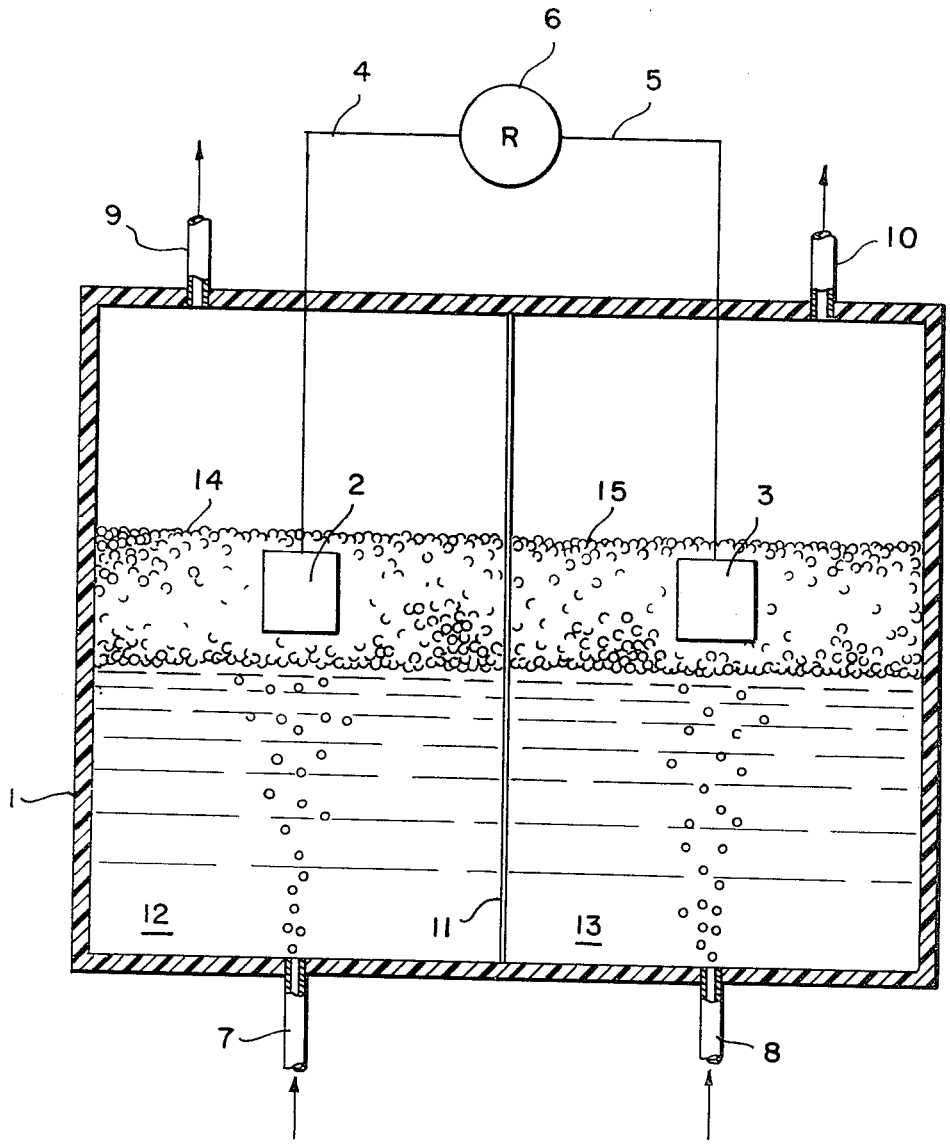
INVENTORS.
LEONARD NANIS
FRANK R. McLARNON
BY
Caesar, Rivise,
Bernstein & Cohen
ATTORNEYS.

FOAM ELECTROLYTE, FUEL CELL, AND METHOD FOR INCREASING EFFECTIVENESS OF FUEL CELLS

This invention relates to a foam electrolyte, fuel cell and method of increasing the effectiveness of fuel cells, although it is by no means limited to these features. In particular the present invention is based in part on the recognition that chemical reactions which heretofore have proceeded with great difficulty because of the insolubility or other reluctance of one or more components to react, can now be promoted by combining such components or any other reactant in a foam atmosphere.

While the theory of the present invention has not been definitely ascertained, and with there being no desire to be limited to a particular theory, it is believed that one reason for the significant advances achieved by the present invention lies in the far greater mass transfer characteristics achieved through the use of foam.

Fuel cells provide a handy source of energy, and while the discovery of the fuel cell dates back to 1839, the recent space program has given considerable notoriety to the fuel cell. In a fuel cell the energy of a fuel, like hydrogen or even liquid fuels is converted electrochemically to provide electrical energy on a continuous basis. The typical fuel cell is provided with fuel at one electrode and an oxidizing material at the other electrode, with continuous action of the fuel cell being sustained with the continuous replenishment of the fuel and the oxidant.

In the typical fuel cell the two electrodes are not attacked, and retain their form indefinitely. The typical fuel cell further includes one oxidizing electrode that is the anode and the other reducing electrode which is the cathode, with the two electrodes being linked electrically by an electrolyte for the purpose of ion transport. An external circuit is connected between the anode and the cathode which is actually the output of the fuel cell.

In many instances the fuel cell is divided into an anode compartment and a cathode compartment by a membrane which allows electrical transfer only.

In view of the foregoing it will be seen that the fuel at the anode is oxidized electrochemically to supply electrons to the anode to maintain its negative character. At the cathode the oxidizing materials are reduced, and thereby carry away electrons from the positive cathode. By virtue of the foregoing, an electrical potential is established to cause electron flow in the external circuit.

A considerable number of efforts have been made to increase the output of a fuel cell, and indeed the space program has spurred on such efforts. Where a gaseous fuel and oxidant are used, it has been recognized in the prior art that the effective area of electrodes should be increased, and indeed reference is made to Weiss et al. U.S. Pat. Nos. 3,188,241 and 3,403,055 for efforts in such direction.

Another effort in this direction is set forth in U.S. Pat. No. 3,375,139 which suggested the use of an oxygen complexing agent to increase the rate of supply of oxygen to the reactive electrode surface.

In the foregoing efforts as well as others to be discussed, it was recognized that the effective reaction area lies in the critical zone among the electrode, the electrolyte and the fuel or oxidant. In order to promote greater contact in this critical area it was suggested in Worsham et al., U.S. Pat. No. 3,258,364 to use a surfactant to promote greater contact, and indeed some increase in efficiency was obtained.

Another effort along these lines was to be found in Blomgren, U.S. Pat. No. 3,313,656 which utilized a dispersion forming means to act upon the electrolyte - fuel mixture. However, such dispersion forming means was located at a point remote from the electrode, and while U.S. Pat. No. 3,313,656 mentioned the formation of bubbles, nothing was suggested in this patent in the direction of maintaining such bubbles in a semi-permanent or permanent condition at the electrodes. Also, there is no recognition in this patent of the significant results obtained by the maintenance of a foam in the electrode area as will be discussed in connection with the present invention.

As previously mentioned, the present invention is by no means limited to fuel cells, but rather has application to practically any type of chemical reaction for the purpose of promoting such reaction.

It is therefore an object of the present invention to provide a means for promoting chemical reaction as exemplified by electrolytes in an electrolytic or fuel cell in a very simple manner which also offers advantages cost-wise as will be discussed hereinafter.

In particular, one aspect of the present invention contemplates the fuel cell and a method for directly contacting electrochemical electrodes with a foamed electrolyte in order to enhance the access of reacting chemicals to the electrode surface. It is believed that the reactants saturate the walls of the foam bubbles very rapidly. The thin-walled bubbles break, run down over the electrode, and provide the electrode with solution continuously charged with freshly saturated reactant. The increase in the rate of transport of reactant to the electrode surface made possible by the immersion of the electrode into the foam makes feasible the reaction, i.e. electroreduction or electrooxidation, of chemicals which are only slightly soluble in the electrolyte.

Other objects and many of the attendant advantages of the invention will be observed by reference to the FIGURE of the drawing as well as certain examples of the invention to be set forth hereinafter.

It will be seen that the FIGURE is a view of a fuel cell embodying the present invention which also illustrates the foam electrolyte of the present invention as well as the method of the present invention.

With reference to the FIGURE it will be seen that there is a vessel 1 having anode 2 and cathode 3. Leads 4 and 5 extend respectively from the anode and the cathode in order to complete the external circuit which includes resistive device 6.

Adjacent the bottom of vessel 1 there is a fuel inlet 7 and an oxidant inlet 8. In the preferred embodiment of the present invention the fuel is gaseous hydrogen and the oxidant is gaseous oxygen. Other fuels and oxidants will readily occur to those skilled in the art, and the present invention is by no means limited to gaseous fuels or oxidants, but indeed foams comprising an electrolyte and a liquid fuel or an electrolyte and a liquid oxidant are well within the scope of the present invention.

With further reference to the FIGURE, it will be seen that there is an anode outlet 9 and a cathode outlet 10. Also, there is a permeable divider 11, such as a membrane which maintains a physical separation between the anode and cathode compartments, but permits ion transfer between these two compartments.

It will be seen that there is an electrolyte 12 in the anode compartment and an electrolyte 13 in the cathode compartment. By virtue of the present invention there is a foam 14 formed upon the top of the anode electrolyte 12, with the foam 14 essentially surrounding and embracing the anode 2. A similar cathode foam 15 is formed upon the top of the cathode electrolyte 13 and embraces the cathode 3.

The anode 2 and the cathode 3 are inert in the sense that neither one of them is eaten away as the fuel cell continues to operate. In an embodiment of the present invention both the anode 2 and the cathode 3 are square in shape and are of smooth platinum. The electrode may be present in other shapes as will occur to those skilled in the art. For instance, a spiral shape may be desired in order to promote increased contact by allowing the foam to pass between the spiral folds, which will be sufficiently spaced from each other to avoid clogging. There is no need to use roughened or skeletonized electrodes as was popular in the prior art fuel cells. This in itself achieves a considerable savings in cost. In one embodiment of the invention the electrodes were square with the anode 2 and the cathode 3 each being about ½ mm. thick and having a surface area of 5 cm. square total surface area.

The foam 14 or the foam 15 is achieved with the addition of commonly available foaming agents to the electrolyte. Typical electrolytes used are 4N $H_2SO_4$ and 2N KOH, although other electrolytes will readily occur to those skilled in the art. The foaming agent is simply added to the electrolyte and if desired, simple agitation will form an immediate foam 14 or 15 about the anode 2 or cathode 3.

There is no need for further agitation since the rising gaseous bubbles of either hydrogen or oxygen provide sufficient agitation in themselves to maintain the foam about the respective electrodes. It has been determined that the foam should not be too rigid, and indeed it is preferred that the foam have the characteristics such that it will tend to collapse and disperse in a short time when the gaseous supply of hydrogen or oxygen is turned off. As such the foam may be regarded as a semi-permanent or collapsing foam, although certainly more rigid and permanent foams should operate quite satisfactorily in connection with the present invention.

While the applicants do not wish to be bound by any particular theory, it is believed that the presence of the electrolyte foam about the particular electrode of the cell creates a medium for active mass transfer between the foam and a particular electrode. The oncoming bubbles of gas are readily absorbed into such a medium, and brought to the crucial reaction area which comprises the electrolyte, the electrode and the fuel or the oxidant. In particular, the gaseous fuel or oxidant quickly saturates the walls of the foam bubbles. The thin-walled bubbles break, run down over the electrode, and provide the electrode with solution continuously charged with freshly saturated gaseous fuel or oxidant. The increase in the rate of transport of fuel or oxidant to the electrode surface made possible by the immersion of the electrode into the foam makes feasible the reaction of chemicals which are only slightly soluble in the electrolyte.

The present invention is applicable to practically any chemical reaction where solubility or diffusivity of chemicals is a problem. It is believed that some or all of the reactant may be formed into a foam, and the remaining reactants simply added to such foam. It is believed that high rates of mass transfer are promoted with the use of foam.

It has been found that the following foaming agents have proved to be satisfactory but others will readily occur to those skilled in the art:

1. Carboxane TW–100 (Textilana Corp., Hawthorne, California) which is an alcohol ethoxylate $C_2H_5$—O—R—OH, where R is an alkyl chain with about 42 carbon atoms).

2. Aromox T/12 which is a bis(2-hydroxethyl) cocoamine oxide made by the Armour Industrial Chemical Co., Chicago, Illinois.

3. GAFAC RE–610, a free acid of a complex organic phosphate ester, made by GAF Corp., New York, New York.

Many other foams may be used so long as they do not interfere with the operation of the fuel cell.

The following examples are illustrative of the invention:

1. Hydrogen is bubbled into an anode compartment and oxygen into a cathode compartment. The electrolyte is concentrated 4N $H_2SO_4$ with 0.1 wt. percent Carboxane TW–100 (Textilana Corp., Hawthorne, California), an alcohol ethoxylate ($C_2H_5$—O—R—OH, where R is an alkyl chain with about 42 carbon atoms). The pressure and temperature are ambient and the electrodes are smooth platinum. With the electrodes immersed completely in the foam, the limiting current density obtainable ranges from 10 to 25 mA./cm.$^2$ which is 20–50 times that obtained with the electrodes immersed in well-stirred electrolyte not in the foam region.

2. In another fuel cell application hydrogen is used to produce a foam layer on top of a pool of concentrated 4N $H_2SO_4$. The foam is produced by bubbling hydrogen fuel into the electrolyte to which has been added 0.1 wt. percent Aromox T/12, a bis(2-hydroxyethyl) cocoamine oxide made by the Armour Industrial Chemical Co., Chicago, Illinois. A tenfold increase from 0.32 to 3.2 mA./cm.$^2$ is produced for the maximum rate of hydrogen oxidation at a smooth platinum anode immersed totally in the foam as compared with the same electrode submerged in the liquid electrolyte which is vigorously stirred by the hydrogen entering the system.

3. In concentrated alkaline electrolyte comprising 2N KOH, enhanced transport of dissolved hydrogen is produced by the foam resulting from the addition of 0.1 wt. percent GAFAC RE–610, a free acid of a complex organic phosphate ester, made by GAF Corp., New York, N. Y. Available fuel cell voltage is increased by 0.7 volt since the anode potential is improved by the ready access of $H_2$ dissolved in the electrolyte as a result of the circulation in the foam structure surrounding a smooth platinum anode. The otherwise unusable anode may be thus employed at currents up to 0.5 mA./cm.$^2$ without excessive polarization.

4. In another example, hydrogen was bubbled into the anode compartment, and oxygen was bubbled into the cathode compartment. A limiting anodic current density of 12 mA./cm.$^2$ in 4N $H_2SO_4$ was maintained substantially constant for the electrodes immersed completely in foam produced by the addition of Carboxane TW–100 (Textilana Corp., Hawthorne, California) to the 4N $H_2SO_4$ in amounts ranging from 0.02 to 0.5 wt. percent.

5. In another example, 0.5 wt. percent Carboxane TW–100 was added to 4N $H_2SO_4$ electrolyte. With oxygen bubbled into the cathode compartment, the available cell voltage was increased by 0.3 volt (at a current density of 1.0 mA./cm.$^2$) when the cathode was withdrawn from the liquid electrolyte into the foam.

It can be seen from the foregoing examples that the present invention substantially increases the efficiency of a fuel cell, and at the same time achieves a savings in cost through the use of smooth electrodes.

Without further elaboration, the foregoing will so fully illustrate our invention that others may, by applying current or future knowledge, readily adapt the same for use under various conditions of service.

What is claimed as the invention is:

1. A method for increasing the effectiveness of a fuel cell, said fuel cell comprising an anode compartment and a cathode compartment, an electrolyte for said anode and cathode compartments, means to deliver fuel to said anode compartment and oxidant to said cathode compartment, said method comprising adding a foaming agent to said electrolyte, agitating said electrolyte to create a layer of foam containing fuel above said electrolyte, and positioning an anode and cathode substantially only in said foam layer.

2. The method of claim 1 wherein said anode and cathode are only in said foam layer.

3. The method of claim 2 wherein said fuel is a gas.

4. The method of claim 3 wherein said oxidant is a gas.

5. The method of claim 4 wherein said gases quickly saturate the walls of the foam electrolyte bubbles, with the bubbles breaking to run down over the electrode and provide, on a continuous basis, freshly saturated fuel or oxidant to the electrode.

6. A method of promoting an electrochemical reaction involving one or more reactants, said electrochemical reaction being carried out through the presence of an anode compartment and a cathode compartment, said method comprising adding a foaming agent to the reactants, agitating said reactants to create a layer of foam containing said reactants, positioning an anode and a cathode at least partially in said foam so that said electrochemical reaction is promoted by the presence of said foam.

7. In a fuel cell comprising an anode compartment and a cathode compartment, an electrolyte for said anode and cathode compartments, means to deliver fuel to said anode compartment and oxidant to said cathode compartment, the improvement comprising providing a portion of said electrolyte as a layer of foam containing fuel and positioning an anode and cathode substantially only in said foam layer.

8. The fuel cell of claim 7 wherein said anode and cathode are only in said foam layer.

9. The fuel cell of claim 8 wherein said fuel is a gas.

10. The fuel cell of claim 9 wherein said oxidant is a gas.

* * * * *